United States Patent
Matsuba

(10) Patent No.: US 8,390,845 B2
(45) Date of Patent: Mar. 5, 2013

(54) IMAGE PROCESSING APPARATUS, IMAGE PROCESSING SYSTEM, COOPERATION METHOD FOR THE IMAGE PROCESSING APPARATUS, AND COMPUTER-READABLE MEDIUM

(75) Inventor: Takafumi Matsuba, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 989 days.

(21) Appl. No.: 12/013,121

(22) Filed: Jan. 11, 2008

(65) Prior Publication Data

US 2008/0174803 A1 Jul. 24, 2008

(30) Foreign Application Priority Data

Jan. 19, 2007 (JP) .................................. 2007-010145

(51) Int. Cl.
*H04N 1/387* (2006.01)
*G06F 3/12* (2006.01)
(52) U.S. Cl. ...................................... 358/1.15; 358/453
(58) Field of Classification Search .................. 358/448, 358/1.15, 468, 443, 453, 1.18, 434, 436, 358/400
See application file for complete search history.

(56) References Cited

U.S. PATENT DOCUMENTS

| | | | |
|---|---|---|---|
| 4,994,926 A * | 2/1991 | Gordon et al. ................. | 358/400 |
| 5,930,255 A | 7/1999 | Tsukamoto et al. | |
| 5,954,793 A * | 9/1999 | Stutman et al. ............... | 709/204 |
| 6,614,546 B1 | 9/2003 | Kurozasa | |
| 6,750,982 B1 | 6/2004 | Takaira et al. | |
| 6,959,437 B2 | 10/2005 | Schacht et al. | |
| 6,975,415 B2 | 12/2005 | Yamade | |
| 7,123,368 B2 | 10/2006 | Sugahara | |
| 7,209,950 B2 * | 4/2007 | Bennett et al. ................. | 709/206 |
| 2004/0117663 A1 * | 6/2004 | Colvin .......................... | 713/202 |
| 2004/0148525 A1 * | 7/2004 | Aida et al. ..................... | 713/201 |
| 2004/0156074 A1 * | 8/2004 | Kim .............................. | 358/1.15 |
| 2005/0174609 A1 * | 8/2005 | Thurlow ........................ | 358/425 |
| 2005/0210295 A1 * | 9/2005 | Iwamura ....................... | 713/201 |
| 2005/0255853 A1 * | 11/2005 | Ewert et al. ................. | 455/456.1 |
| 2007/0011293 A1 * | 1/2007 | Lee ............................... | 709/223 |
| 2008/0071580 A1 * | 3/2008 | Marcus et al. ................ | 705/3 |
| 2009/0080011 A1 * | 3/2009 | Shen ............................. | 358/1.15 |
| 2009/0089457 A1 * | 4/2009 | Zhan ............................. | 710/4 |
| 2010/0223663 A1 * | 9/2010 | Morimoto et al. ............. | 726/7 |

FOREIGN PATENT DOCUMENTS

JP 2001-296976 10/2001
JP 2005-157451 6/2005

OTHER PUBLICATIONS

JP Office Communication mailed Dec. 9, 2008, directed towards counterpart JP Application No. 2007-010145; 2 pages.

* cited by examiner

*Primary Examiner* — Jerome Grant, II
(74) *Attorney, Agent, or Firm* — Morrison & Foerster LLP

(57) ABSTRACT

An image processing apparatus is provided with a terminal designation accepting portion that accepts a designation by a user to designate an IP address of a terminal to be connected to the image processing apparatus and a setting data control portion that sends, to the terminal, setting data that includes an IP address of the image processing apparatus itself based on the IP address of the terminal that is designated by the user. Thereby, in the case where the image processing apparatus is caused to cooperate with other apparatus via a communication line, a more user-friendly operation for the cooperation can be provided with the security of the image processing apparatus protected compared to conventional systems.

20 Claims, 16 Drawing Sheets

[Device Name]
　　COMPANY X C450
[Driver]
　　PCL6
　　・Windows 98SE/ME
　　・Windows 2000/XP/2003
　　・Windows NT4. 0
　　PostScript 3
　　・Windows 98SE/ME
　　・Windows 2000/XP/2003
　　・Windows NT4. 0
　　・Macintonsh9/OS X VER. 10 OR LATER
[IP address]
　　192. 168. 1. 101
[Option Structure]
　　　PAPER FEEDING UNIT : PC-402
　　　PAPER DISCHARGE UNIT : FS-603
　　　PUNCH KIT : NO
　　　FAX KIT : NO
　　　HARD DISK DRIVE : NO

WN2

WN3

WN4

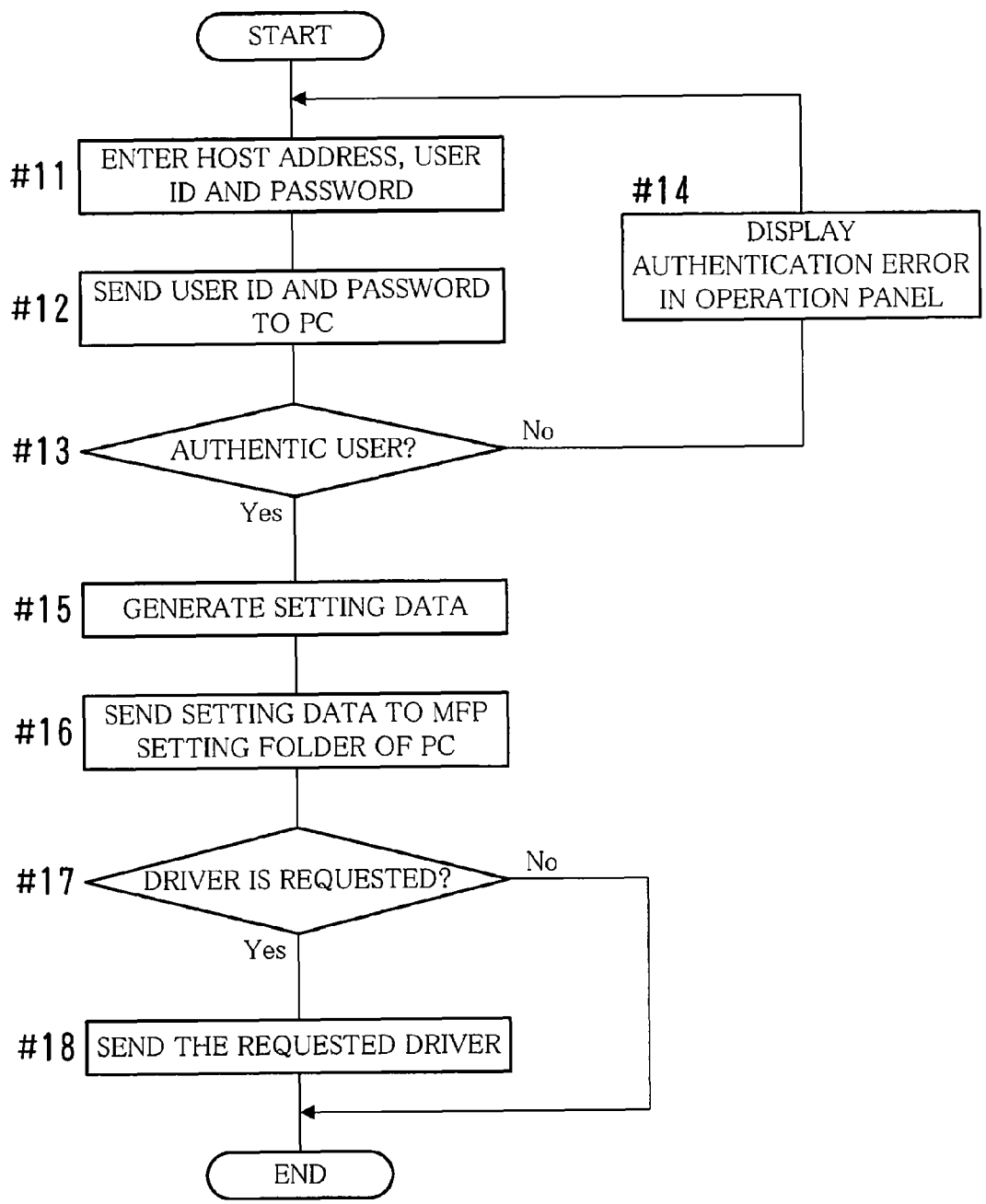

IMAGE PROCESSING APPARATUS, IMAGE PROCESSING SYSTEM, COOPERATION METHOD FOR THE IMAGE PROCESSING APPARATUS, AND COMPUTER-READABLE MEDIUM

This application is based on Japanese patent application No. 2007-010145 filed on Jan. 19, 2007, the contents of which are hereby incorporated by reference.

BACKGROUND OF THE INVENTION

1. Field of the Invention

The present invention relates to an image processing apparatus such as an MFP, and a system configured by the image processing apparatus and a terminal.

2. Description of the Related Art

Intranets have recently been prevalent in corporate offices, government offices and other offices. In addition, image processing apparatuses called Multi Function Peripherals (MFPs) have recently been equipped with a network function, so that the image processing apparatuses come to be used in cooperation with other devices such as personal computers in intranets.

In order to use an image processing apparatus in cooperation with a personal computer, for example, an operation is required for installing on the personal computer a driver such as a printer driver for controlling the image processing apparatus. Further, other operation is also required for informing the personal computer of identification information of the image processing apparatus depending on a protocol. In the case where, for example, TCP/IP is used as the protocol, such identification information is an IP address of the image processing apparatus.

With a desktop personal computer, an image processing apparatus that usually cooperates therewith is not changed. Accordingly, in the case where an image processing apparatus or a personal computer is newly introduced, both the operations described above only once are enough.

Laptop personal computers have recently been reduced in size and price and increased in performance. In many cases, a wired LAN interface was an optional extra up until a few years ago. At present, however, almost all laptop personal computers include such a wired LAN interface as standard equipment. Besides, personal computers are marketed that also include a wireless LAN interface as standard equipment, which probably allows joining a network outside the home more freely.

The number of users increases who carry a laptop personal computer and use the same to join a network outside the home. Probably, from now on, the number of users will increase who use a personal computer in cooperation with an image processing apparatus provided in the network.

If such is the case, a user is required to perform both the operations described above concerning a driver and identification information every time when an image processing apparatus to be used in cooperation with his/her personal computer is changed, which is troublesome for the user.

There is proposed a method disclosed in Japanese unexamined patent publication No. 2001-296976. In the method, a client and a printer that are present in the same network are configured as follows.

The printer is provided with a printing processing part for printing data received from the client, a printer driver for performing operation control of the printer and a driver managing part for managing the driver. The client is provided with an application for preparing an original to be transmitted, an install processing part for receiving the driver via the driver managing part from the printer when no printer driver is installed yet on the client, and the printer driver installed by the install processing part.

According to conventional methods including the method disclosed in Japanese unexamined patent publication No. 2001-296976, it is necessary that a user should know identification information (an IP address or the like) of an image processing apparatus to cooperate with a personal computer (a client) by inquiring of an administrator as to the identification information in advance or others and should enter the identification information into the personal computer.

From the security viewpoint, however, disclosing identification information of an image processing apparatus may be undesirable. Because if identification information of an image processing apparatus becomes widely known, the image processing apparatus may be used for fraud or may become a target for Denial of Service (DoS) attack.

According to the conventional methods, in the case where a plurality of image processing apparatuses is present in the same network, it is difficult for a user to understand which of the image processing apparatuses is to be used in cooperation through the operation performed by the user, let alone to understand that in the case where a user attempts to cause his/her personal computer to cooperate with an image processing apparatus installed in an unfamiliar location.

SUMMARY

The present disclosure is directed to solve the problems pointed out above, and therefore, an object of an embodiment of the present invention is to, when an image processing apparatus is caused to cooperate with other apparatus such as a personal computer via a communication line, protect the security of the image processing apparatus and to provide a more user-friendly operation for the cooperation compared to conventional systems.

According to one aspect of the present invention, an image processing apparatus has a function to perform communication with other apparatus via a communication line. The image processing apparatus includes a designation portion that accepts a designation by a user to designate identification information in a network, the identification information being for a connection target apparatus that is an apparatus to be connected to the image processing apparatus, and identification information notification portion that informs the connection target apparatus of identification information in a network of the image processing apparatus itself based on the identification information of the connection target apparatus that is designated by the user with the designation portion.

Preferably, the identification information notification portion may inform the connection target apparatus of structure information on a structure of the image processing apparatus together with the identification information.

Further, the image processing apparatus may include a printer that performs a printing process based on data sent from the connection target apparatus. The structure information indicates a structure relating to an optional extra for the printing process, the optional extra being added to the image processing apparatus.

Moreover, the image processing apparatus may include a user authentication process portion that performs a user authentication process for a user who desires to cause the connection target apparatus to cooperate with the image processing apparatus. The identification information notification portion informs the connection target apparatus of the identification information only when authenticity of the user is verified.

Furthermore, an image processing apparatus can be configured as follows. The image processing apparatus includes a designation portion that accepts a designation by a user to designate a user ID of the user who uses a connection target apparatus that is an apparatus to be connected to the image processing apparatus, a connection target specifying portion that specifies apparatus identification information based on the user ID that is designated by the user with the designation portion, the apparatus identification information being for the connection target apparatus that is caused to connect to the image processing apparatus by the user, and identification information notification portion that informs the connection target apparatus of apparatus identification information of the image processing apparatus itself based on the apparatus identification information of the connection target apparatus that is specified by the connection target specifying portion.

According to another aspect of the present invention, an image processing system is so configured that an image processing apparatus and a terminal are interconnected via a communication line. The image processing apparatus includes a designation portion that accepts a designation by a user to designate identification information in a network, the identification information being for the terminal to be connected to the image processing apparatus itself, and identification information notification portion that informs the terminal of identification information of the image processing apparatus itself based on the identification information of the terminal that is designated by the user with the designation portion. The terminal includes a setting process portion that performs a setting process for cooperating with the image processing apparatus based on the identification information of the image processing apparatus, the identification information being notified by the image processing apparatus.

The structure described above makes it possible to, when an image processing apparatus is caused to cooperate with other apparatus such as a personal computer via a communication line, protect the security of the image processing apparatus and to provide a more user-friendly operation for the cooperation compared to conventional systems.

These and other characteristics and objects of the present invention will become more apparent by the following descriptions of preferred embodiments with reference to drawings.

BRIEF DESCRIPTION OF THE DRAWINGS

FIG. 5 shows an example of setting data.

FIG. 13 is a flowchart showing an example of the entire processing flow in an image processing apparatus.

DESCRIPTION OF THE PREFERRED EMBODIMENTS

Figure 1:
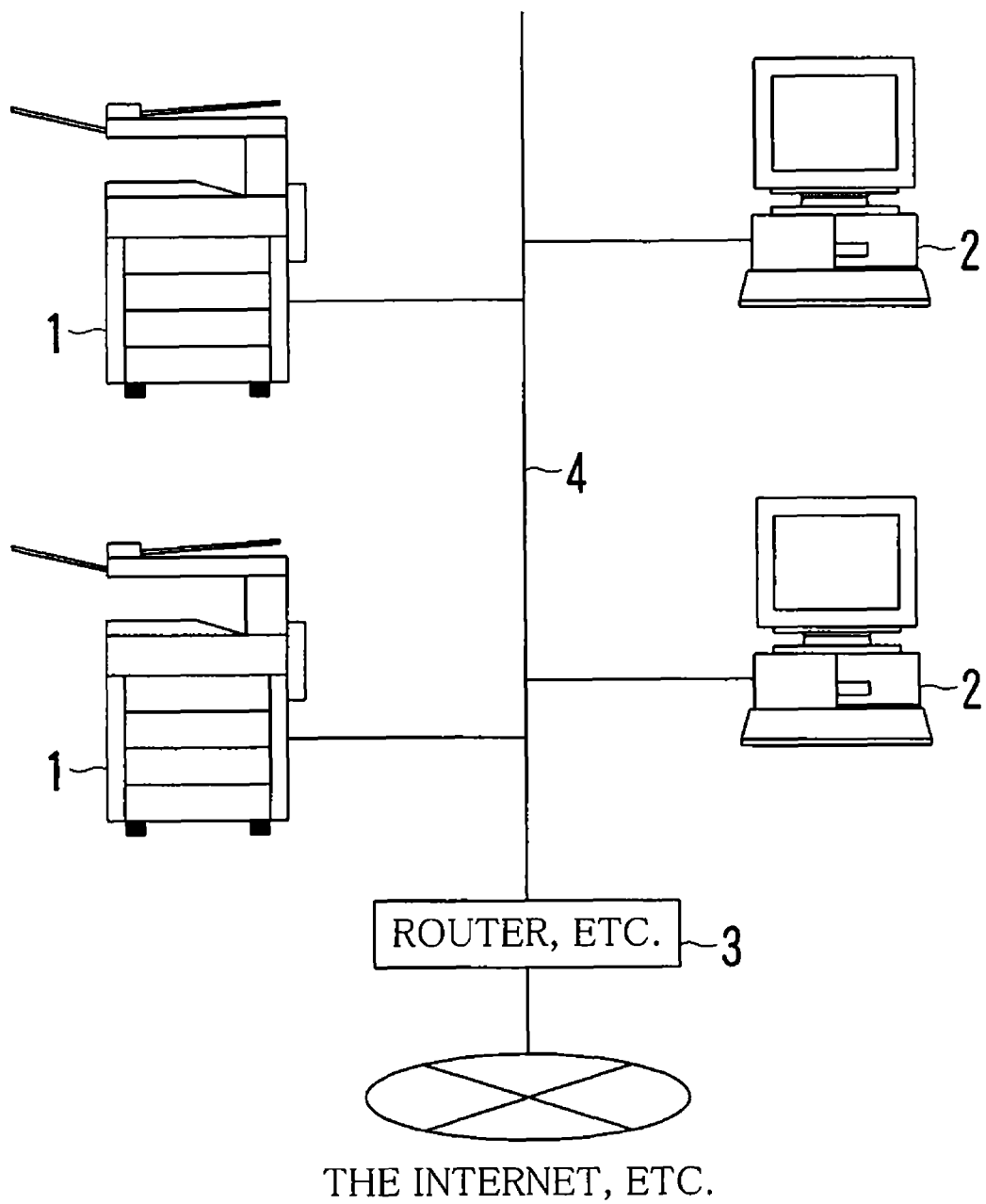
FIG. 1 is a diagram showing an example of the entire configuration of an image processing system.

Referring to FIG. 1, an image processing system IMS includes one or more image processing apparatuses 1, a plurality of terminals 2, network equipment 3 such as a router and a hub, and a communication line 4. The image processing apparatuses 1, the terminals 2 and the network equipment 3 can be interconnected via the communication line 4. A LAN line, a public line, a dedicated line or the like is used as the communication line 4. Each of the apparatuses is given a unique IP address and MAC address.

The router is used for connecting the image processing system IMS to an external network such as the Internet. Thereby, the image processing apparatuses 1 and the terminals 2 can perform communication with apparatuses that are present on the external network. In the case where the image processing system IMS is provided in a Virtual Private Network (VPN), the Internet is sometimes used as the communication line 4.

The image processing apparatus 1 and the terminal 2 cooperate with each other to perform various processing relating to an image. For example, an image generated by the terminal 2 is printed with the image processing apparatus 1. In addition, image data of an original image read with the image processing apparatus 1 is saved in the terminal 2.

The image processing apparatus 1 is an apparatus into which various functions such as a copy function, a scanner function, a FAX function, a network printing function, a document server function, and a file transfer function are integrated. The image processing apparatuses 1 are sometimes called image forming apparatuses or Multi Function Peripherals (MFPs).

Figure 2:
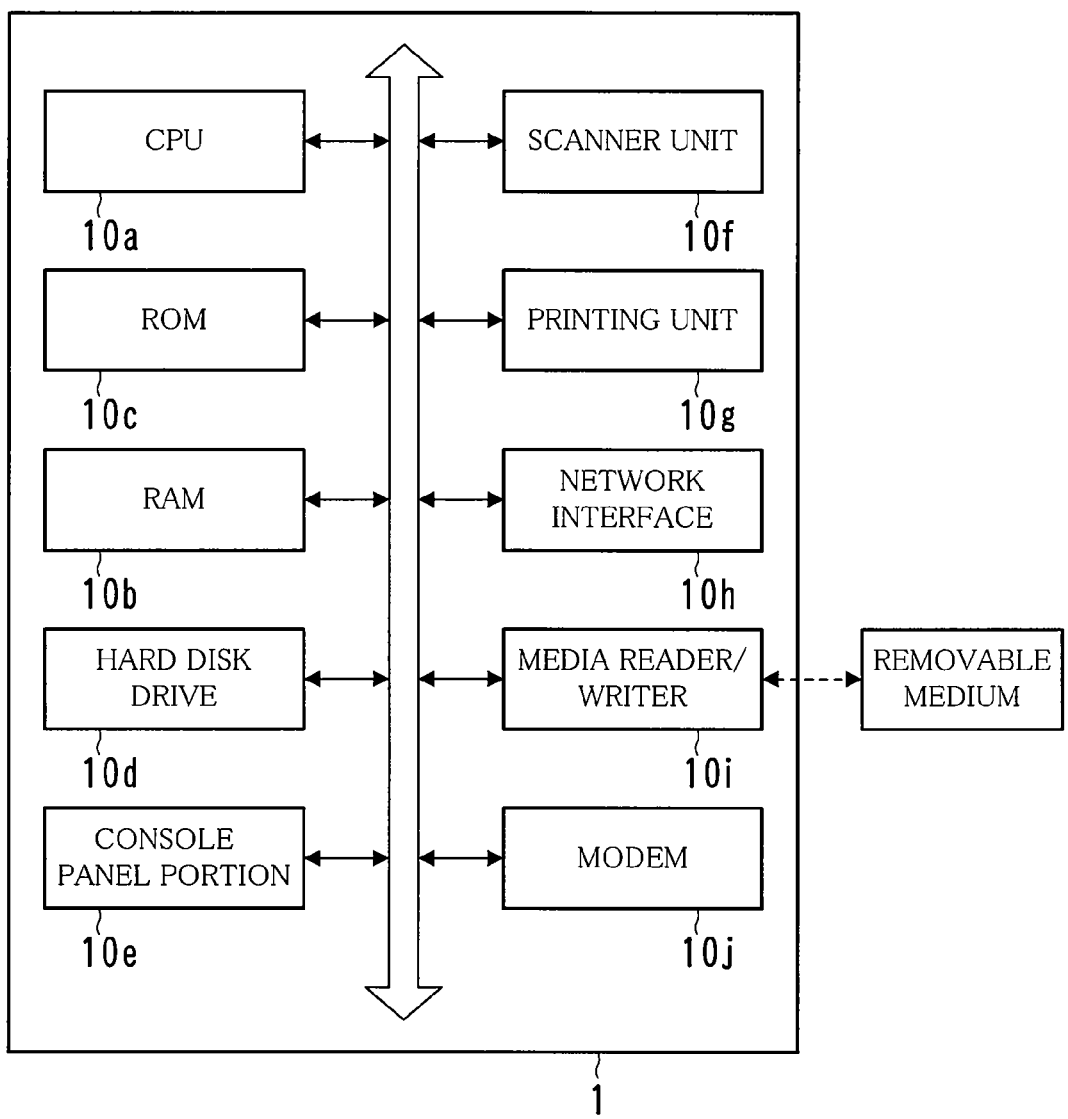
FIG. 2 is a diagram showing an example of a functional configuration of an image processing apparatus.

Referring to FIG. 2, the image processing apparatus 1 includes a CPU 10a, a RAM 10b, a ROM 10c, a hard disk drive 10d, a console panel portion 10e, a scanner unit 10f, a printing unit 10g, a network interface 10h, a media reader/writer 10i, and a modem 10j.

Figure 3:
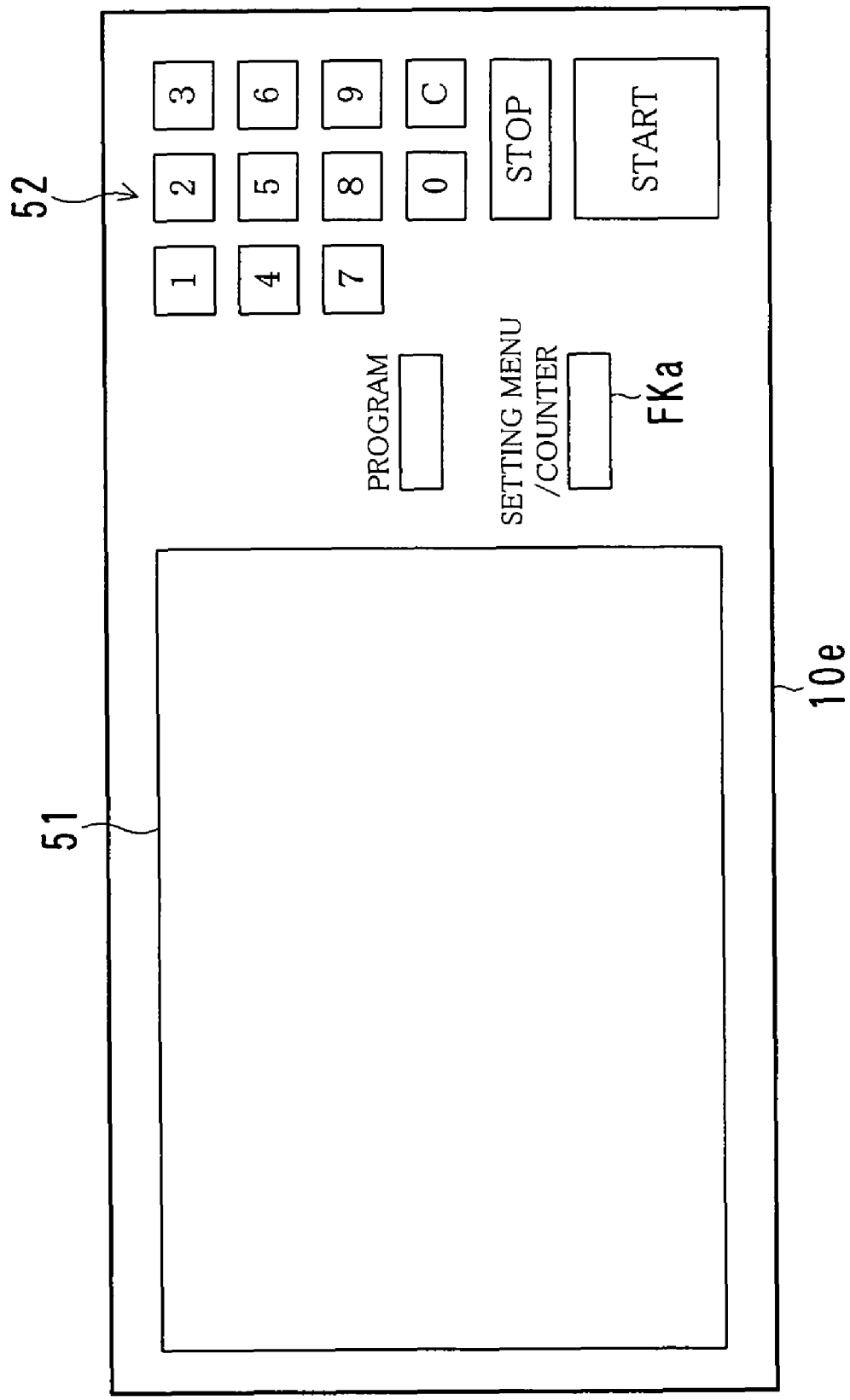
FIG. 3 is a diagram showing an example of a structure of a console panel portion.

As shown in FIG. 3, the console panel portion 10e includes a display 51 and an operation button unit 52 including a plurality of operation buttons.

The operation button unit 52 includes a plurality of keys for entering numerals, characters or symbols, a key (function key) for calling out a predetermined function, a sensor for recognizing a pressed key and a transmission circuit for sending a signal indicating a recognized key to the CPU 10a.

The display 51 serves to display a screen for providing a user who operates the image processing apparatus 1 with messages or instructions, a screen for the user to enter desired types of processing and processing conditions and a screen showing a result of processing performed by the CPU 10a. In this embodiment, a touch panel display is used as the display 51. Accordingly, the display 51 has a function to detect a position on the touch panel display touched by user's finger and to send a signal indicating a detection result to the CPU 10a.

In this way, the console panel portion 10e functions as a user interface for a user who operates the image processing apparatus 1.

Referring back to FIG. 2, the scanner unit 10f optically reads document images including text, numerical expressions, symbols, photographs, diagrams or illustrations that are depicted on a sheet of paper, and generates image data.

The printing unit 10g forms an image based on image data captured with the scanner unit 10f or a print job sent from the terminal 2 and prints the image thus formed on a sheet of paper.

The network interface 10h is a Network Interface Card (NIC) for connecting the image processing apparatus 1 to the terminal 2 or the like for communication.

The media reader/writer 10i is a device for reading out data from a detachable storage medium, i.e., a removable medium and for writing data onto the removable medium. A flash memory reader/writer, an IC card reader/writer, or an MO drive is used as the media reader/writer 10i.

The modem 10j is an interface for performing data communication with a FAX terminal using a fax protocol such as G3.

Figure 4:
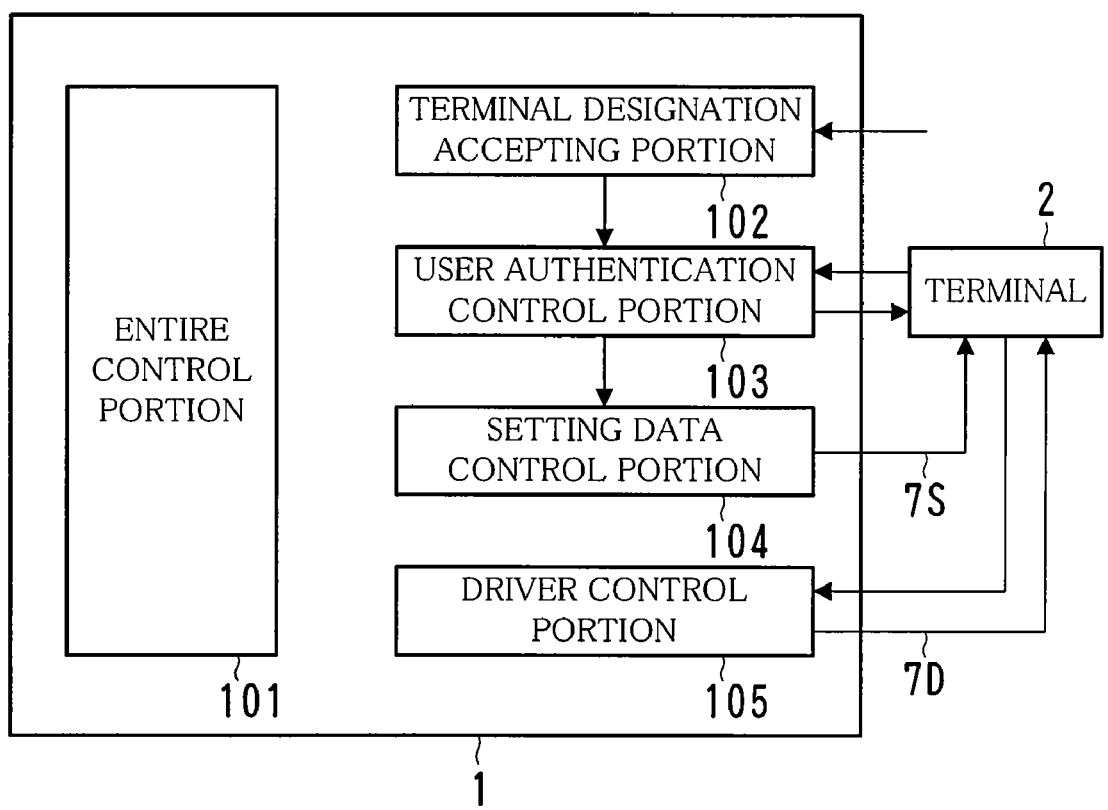
FIG. 4 is a diagram showing an example of a functional configuration of an image processing apparatus.

On the hard disk drive 10d or the ROM 10c are installed programs and data for achieving functions including an entire control portion 101, a terminal designation accepting portion 102, a user authentication control portion 103, a setting data control portion 104 and a driver control portion 105, all of which are shown in FIG. 4. The programs and data are loaded into the RAM 10b as needed so that the CPU 10a executes the programs. A part or the whole of the functions shown in FIG. 4 may be achieved by a circuit.

Other than the above, the hard disk drive 10d saves a driver 7D and setting data 7S therein.

The driver 7D is software for controlling the image processing apparatus 1 remotely in a terminal 2. In this embodiment, the hard disk drive 10d saves a plurality of drivers 7D, e.g., a driver supporting Printer Control Language (PCL) and a driver supporting PostScript. In addition, the drivers 7D are upgraded appropriately every time when a manufacturer releases a new version of the drivers 7D. An old version of each of the drivers 7D may be kept intact. These drivers 7D are distributed to terminals 2 in response to a request, which is described later.

Referring to FIG. 5, the setting data 7S indicates various information on setting for the image processing apparatus 1, e.g., an IP address of the image processing apparatus 1 itself, a device name thereof, information on structures of options (added functions) currently applied to the image processing apparatus 1, and information on the drivers 7D saved in the hard disk drive 10d, that is, information indicating driver names, versions and the corresponding Operating System (OS). The setting data 7S is updated every time when the option structure of the image processing apparatus 1, the drivers 7D saved therein and the like are changed.

Figure 6:
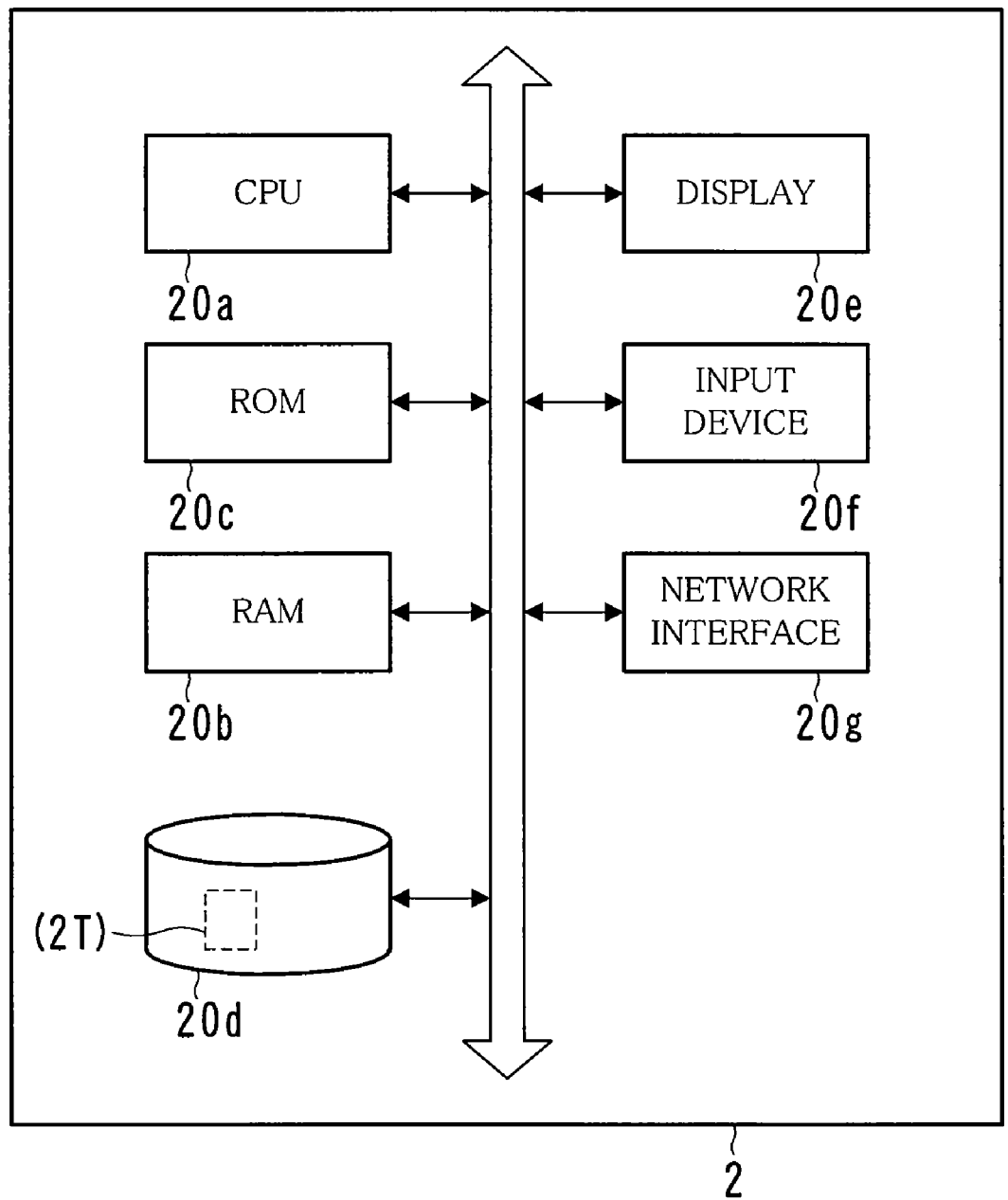
FIG. 6 is a diagram showing an example of a hardware configuration of a terminal.

Referring to FIG. 6, the terminal 2 shown in FIG. 1 includes a CPU 20a, a RAM 20b, a ROM 20c, a hard disk drive 20d, a display 20e, an input device 20f and a network interface 20g. A personal computer, a workstation or others is used as the terminal 2.

The display 20e serves to display an image reproduced based on image data sent from an image processing apparatus 1, a screen for providing the image processing apparatus 1 with instructions, and a message sent from the image processing apparatus 1.

The input device 20f is a device for a user to give instructions to the terminal 2 and to enter various types of information. A keyboard, a mouse or the like is used as the input device 20f.

The network interface 20g is an NIC for connecting the terminal 2 to an image processing apparatus 1 or the like for communication.

Figure 7:
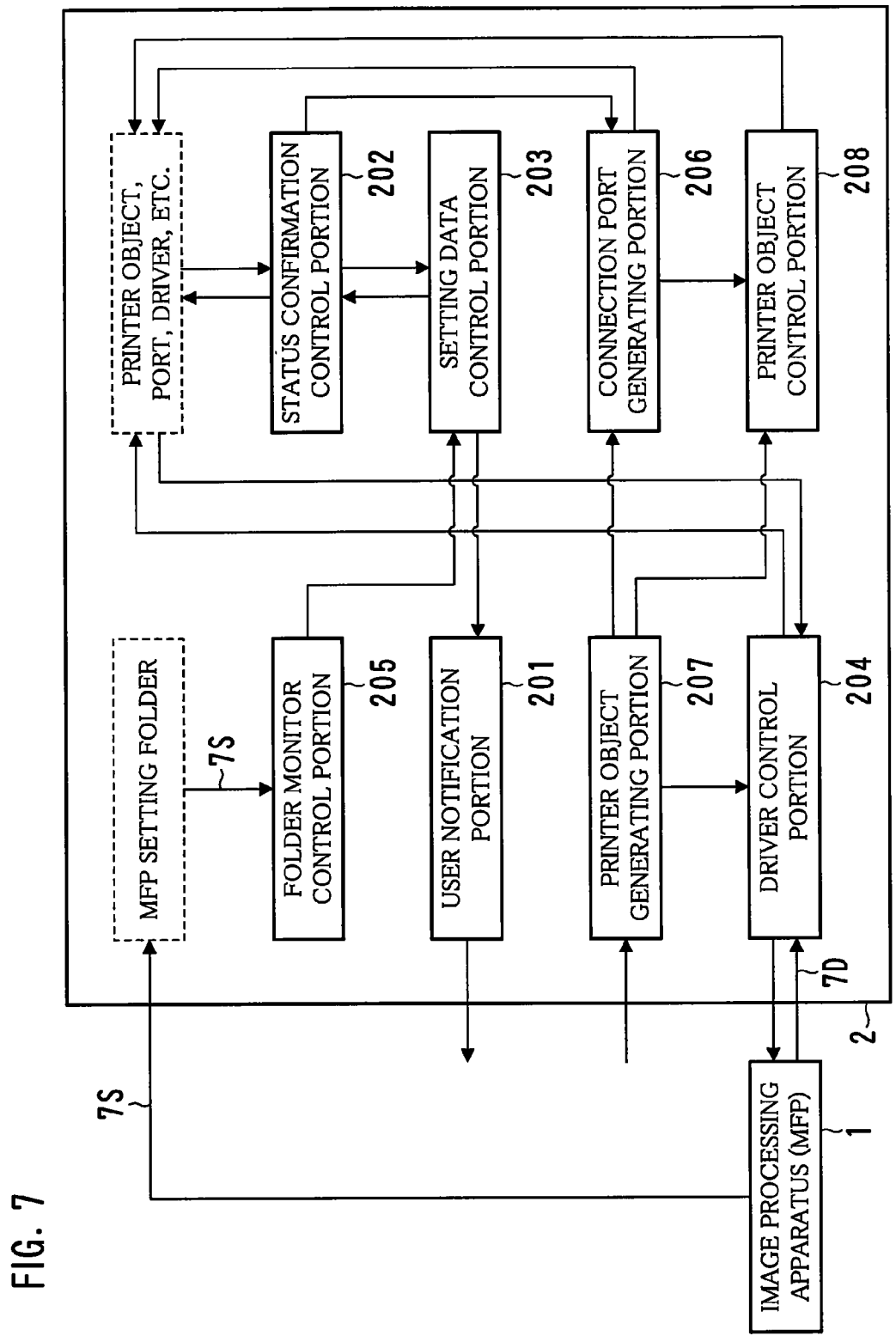
FIG. 7 is a diagram showing an example of a functional configuration of a terminal.

On the hard disk drive 20d or the ROM 20c are installed a program (an Auto Print-object Making (APM) tool 2T) and data for achieving functions including a user notification portion 201, a status confirmation control portion 202, a setting data control portion 203, a driver control portion 204, a folder monitor control portion 205, a connection port generating portion 206, a printer object generating portion 207 and a printer object control portion 208, all of which are shown in FIG. 7. In addition, an Operating System (OS) is installed on the hard disk drive 20d or the ROM 20c. The driver 7D downloaded from the image processing apparatus 1 is also installed on the hard disk drive 10d. The program and data are loaded into the RAM 20b as needed so that the CPU 20a executes the program. Hereinafter, a case in which Windows (registered trademark) of Microsoft Corporation is used as the OS is described as an example.

The following is a description of processing details or others of each portion of the image processing apparatus 1 shown in FIG. 4 and of each portion of the terminal 2 shown in FIG. 7.

Referring to FIG. 4, the entire control portion 101 in the image processing apparatus 1 controls the whole image processing apparatus 1 so that conventional basic processing is performed. For example, the image processing apparatus 1 is so controlled that a predetermined screen is displayed at predetermined timing and that a job such as a scan job, a print job or a data transmission job is executed based on the contents of a command issued by a user.

The terminal designation accepting portion 102 performs processing for accepting designation of an IP address of a terminal 2 to which the user intends to connect the image processing apparatus 1. Such processing is carried out, for example, according to the following procedure.

Figure 8:
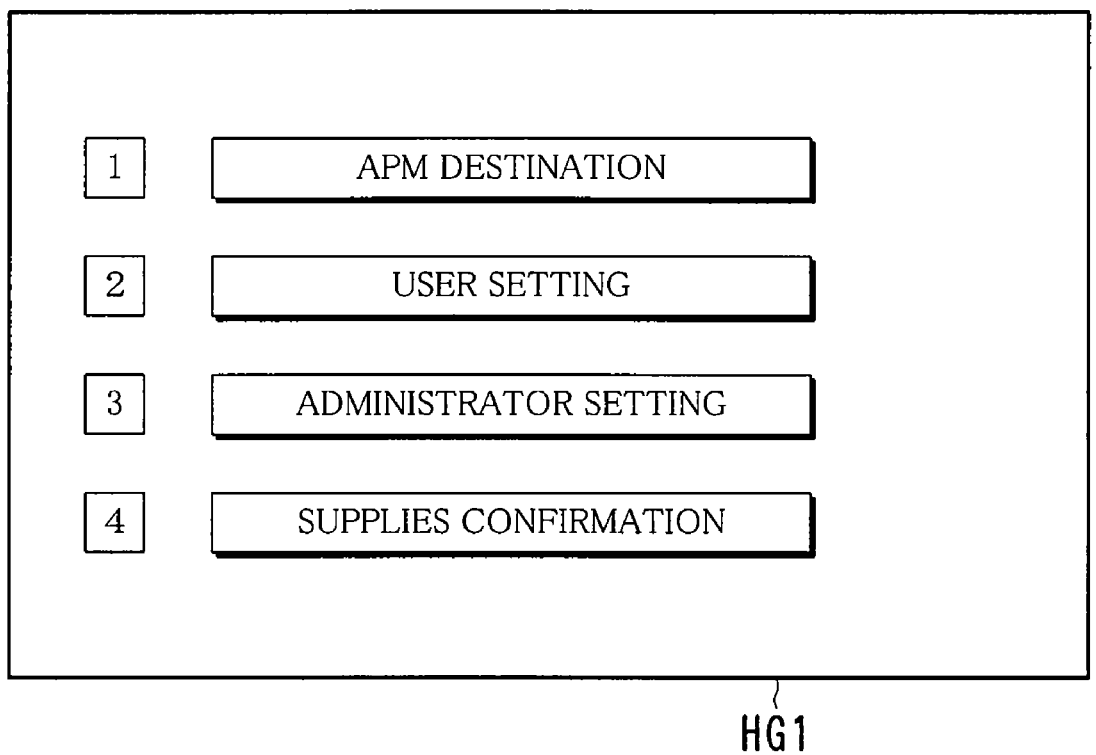
FIG. 8 shows an example of a setting menu screen.
Figure 9:
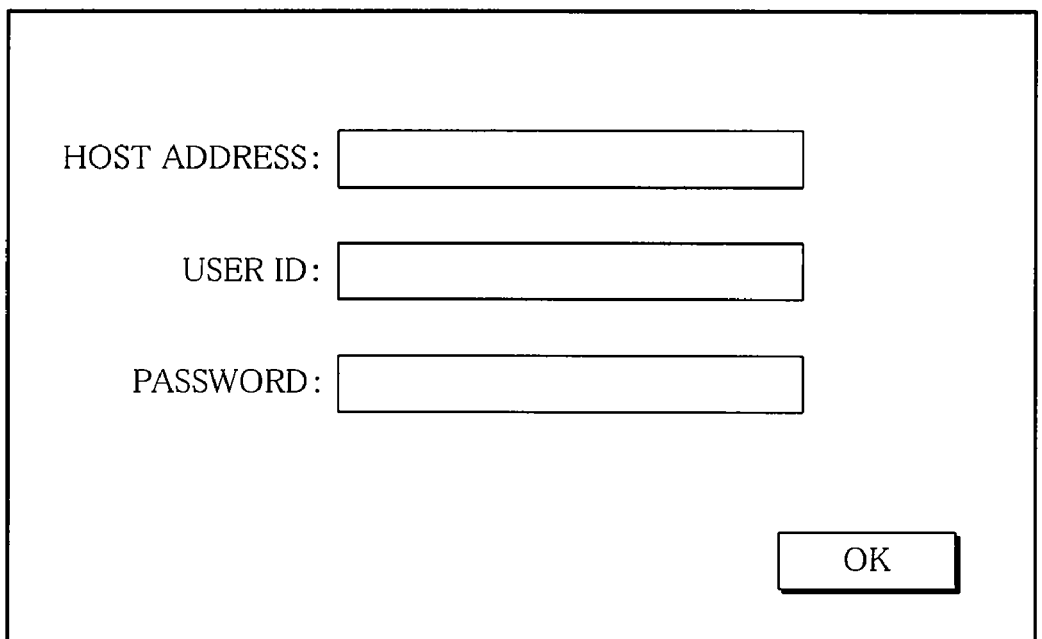
FIG. 9 shows an example of a designation screen.

The terminal designation accepting portion 102 displays a setting menu screen HG1 as shown in FIG. 8 on the display 51 when the user presses a function key Fka (see FIG. 3) in the operation button unit 52 of the console panel portion 10e. The terminal designation accepting portion 102 switches a display screen on the display 51 from the setting menu screen HG1 to a designation screen HG2 as shown in FIG. 9 when the user touches the "APM destination" button in the setting menu screen HG1.

Here, the user enters and designates an IP address of a terminal 2 that is a connection target, and his/her user ID and password in the fields of "host address", "user ID" and "password", respectively. This enables the terminal designation accepting portion 102 to accept the designation of the IP address. The user ID and password thus designated (entered) are used in the subsequent processing portion, i.e., the user authentication control portion 103. Note that, instead of the IP address, the user may designate other information that can identify the terminal 2. For example, a computer name, that is, a so-called host name may be designated instead of the IP address.

The user authentication control portion 103 performs processing for verifying whether or not the user operating the console panel portion 10e is an authentic user, i.e., performs a login authentication process or a user authentication process according to the following procedure.

The user authentication control portion 103 accesses (connects) to the terminal 2 corresponding to the IP address or the host name accepted by the terminal designation accepting portion 102, that is, designated in the designation screen HG2.

After connecting to the terminal 2, the user authentication control portion 103 sends, to the terminal 2, the user ID and the password that are also designated in the designation screen HG2, and thereby requests the terminal 2 to perform user authentication for the user. Responding to this, the terminal 2 performs the user authentication based on the user ID and password as before. Then, the terminal 2 sends the authentication result to the image processing apparatus 1 by return.

The user authentication control portion 103 verifies whether or not the user is an authentic user in accordance with the authentication result sent from the terminal 2.

After the user authentication control portion 103 could verify the authenticity of the user operating the console panel portion 10e, the setting data control portion 104 performs a control operation for calling out the setting data 7S for the image processing apparatus 1 itself from the hard disk drive 10d, and then to send the setting data 7S to the terminal 2.

For example, Server Message Block (SMB) is used as a protocol used for transmission of the setting data 7S to the terminal 2. Accordingly, the setting data 7S sent from the image processing apparatus 1 is saved in a predetermined folder provided in the terminal 2 that is the transmission destination. Hereinafter, the folder for saving the setting data 7S is referred to as an "MFP setting folder". File Transfer Protocol (FTP) may be used instead of SMB. In such a case also, the setting data 7S is saved in the MFP setting folder of the terminal 2.

The driver control portion 105 performs a control operation for calling out the driver 7D that is requested by the terminal 2 from the hard disk drive 10d to send the same to the terminal 2.

Referring to FIG. 7, the user notification portion 201 of the APM tool 2T in the terminal 2 forms an image based on data received from the image processing apparatus 1, data obtained from the OS in the terminal 2 itself or the like and displays the image thus formed on the display 51 of the console panel portion 10e. Thereby, the user is notified of a result of processing performed by the image processing apparatus 1 or the terminal 2.

The status confirmation control portion 202 performs processing of inquiring of the OS as to information on the driver 7 installed on the terminal 2, i.e., a driver name, a version, etc. of the driver 7, information on printer objects provided in the terminal 2, information on a port provided in the terminal 2 and other information, and of confirming the same.

Figure 10:
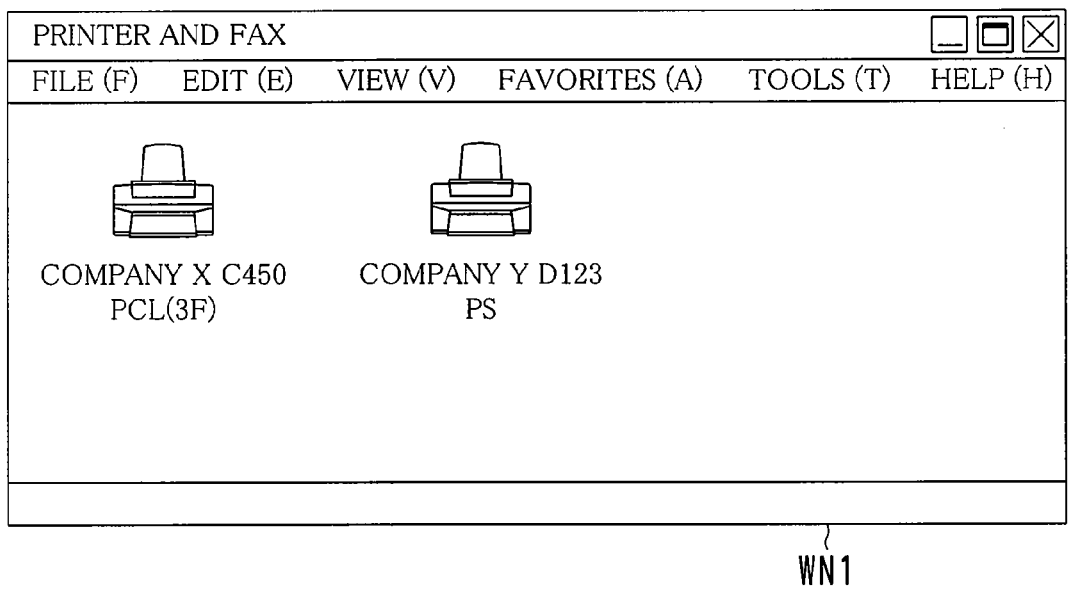
FIG. 10 shows an example of a window.

The "printer object" is one kind of objects handled in Windows and is an object regarding a printer that performs processing in cooperation with the terminal 2. In general, one printer object is prepared for one printer. For a printer object are set a port that is used when the terminal 2 performs communication with the printer, a structure of an option for the printer, a driver name and version of a driver used in order to control the printer, and others. When a predetermined window WN1 as shown in FIG. 10 is opened, icons are displayed on printer object basis. A user can see the icons to confirm printer objects prepared in the terminal 2. Further, the user can arbitrarily give names to the printer objects respectively in accordance with a predetermined rule. Hereinafter, such each name is referred to as a "printer object name". Each of the printer objects is sometimes called a "print object".

In the case where the terminal 2 and a printer are interconnected via the communication line 4, an IP address or a host name is generally set as a port. The port is sometimes called a "network port".

The folder monitor control portion 205 checks whether or not setting data 7S is newly saved in the MFP setting folder of the terminal 2 at regular intervals, e.g., from every few seconds to every tens of seconds. In short, the folder monitor control portion 205 monitors new setting data 7S. When detecting that setting data 7S is newly saved in the MFP setting folder, the folder monitor control portion 205 notifies the setting data control portion 203 to that effect.

Upon receipt of the notification regarding the setting data 7S from the folder monitor control portion 205, the setting data control portion 203 analyzes the setting data 7S for the image processing apparatus 1 with which the terminal 2 should cooperate. Then, the setting data control portion 203 requests each portion to prepare a driver 7D and a printer object that are necessary to perform processing relating to an image in cooperation with the image processing apparatus 1 that is the transmission source. Specifically, the setting data control portion 203 performs the following processing.

Figure 11:
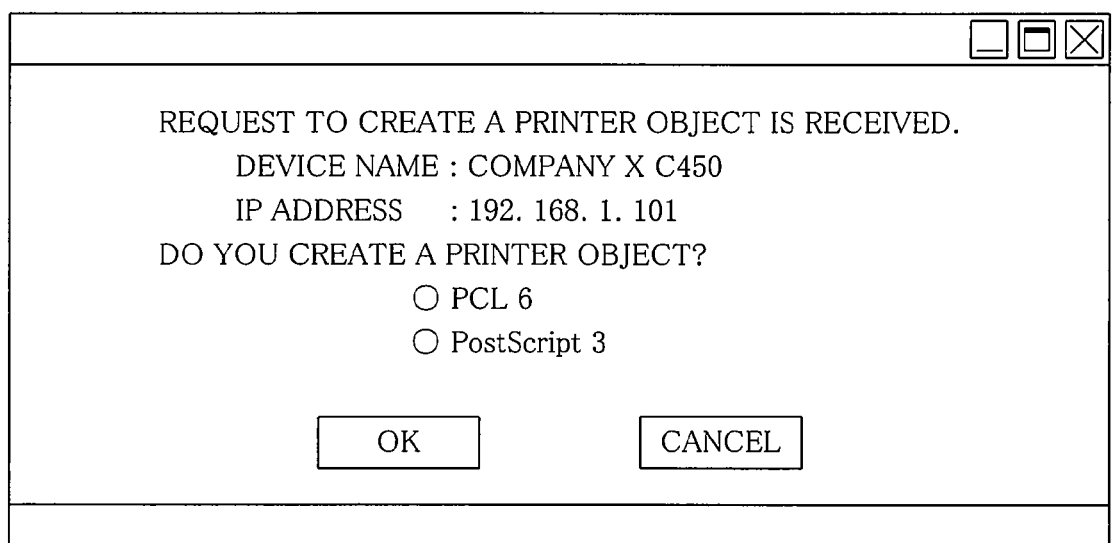
FIG. 11 shows an example of a printer object generation dialogue box.

The setting data control portion 203 analyzes the setting data 7S, so that it confirms a device name of the image processing apparatus 1, an IP address assigned thereto, and driver names and versions of drivers 7D that are prepared in the image processing apparatus 1 and correspond to the OS of the terminal 2. The setting data control portion 203 instructs the user notification portion 201 to display, based on the confirmation result, a printer object generation dialogue box WN2 as shown in FIG. 11 on the display 20e. Responding to this, the user notification portion 201 causes the display 20e to display the printer object generation dialogue box WN2.

Here, a user selects one printer object necessary to cooperate with the image processing apparatus 1 and presses the "OK" button. In the illustrated example, two drivers 7D are presented as options. Stated differently, two printer objects that differ from each other in drivers to be used are presented. The user selects either one of the two drivers 7D and presses the "OK" button.

In response, the setting data control portion 203 requests the printer object generating portion 207 to generate a printer object in accordance with the setting data 7S and the selection made by the user.

The printer object generating portion 207 generates a printer object based on the request sent from the setting data control portion 203 according to the following procedure.

The printer object generating portion 207 confirms whether or not a printer object to be generated this time for the image processing apparatus 1 is already present. More specifically, the printer object generating portion 207 requests the status confirmation control portion 202 to inquire of the OS as to whether or not a printer object is present in which a device name and IP address of the image processing apparatus 1 indicated in the setting data 7S that is sent from the image processing apparatus 1 this time, and a driver 7D that is selected by the user in the printer object generation dialogue box WN2 are set. In response, the status confirmation control portion 202 makes the inquiry to the OS and makes a reply to the printer object generating portion 207.

Figure 12A:
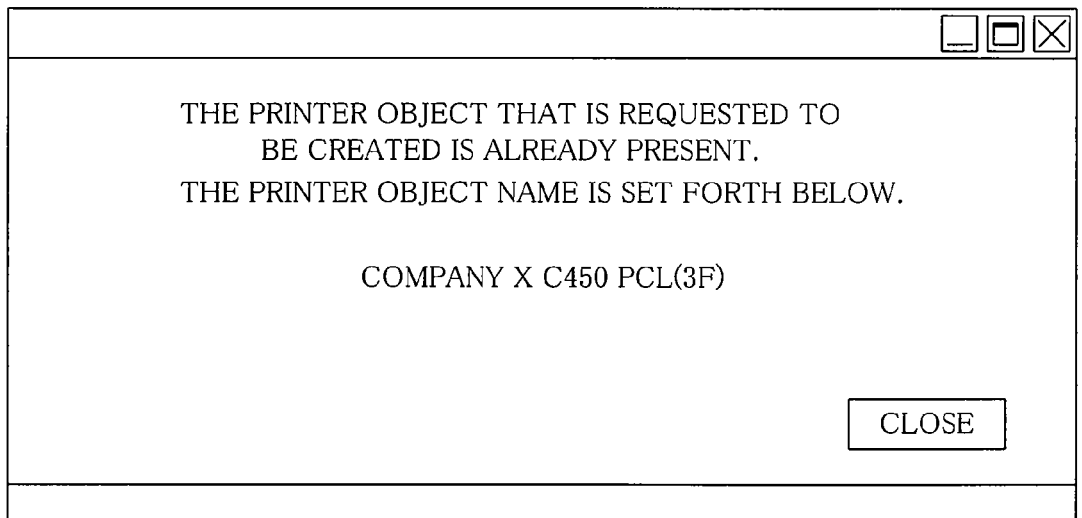
FIGS. 12A and 12B show an example of a result dialogue box.

In the case where the printer object generating portion 207 receives, from the status confirmation control portion 202, a reply to the effect that such a printer object is present, it stops generating a printer object for the image processing apparatus 1. Then, the printer object generating portion 207 instructs the user notification portion 201 to display a result dialogue box WN3 as shown in FIG. 12A on the display 20e.

In contrast, in the case where the printer object generating portion 207 receives a reply to the effect that such a printer object is not present, it causes the OS to generate, based on the setting data 7S sent from the image processing apparatus 1 this time, a printer object for the image processing apparatus 1 to which the driver 7D designated by the user in the printer object generation dialogue box WN2 is applied. Further, the printer object generating portion 207 causes the OS to determine a print object name for the printer object. Alternatively, the printer object generating portion 207 may cause a user to determine a printer object name.

The driver control portion 204 and the connection port generating portion 206 perform the processing as described below in parallel with the processing performed by the printer object generating portion 207 or before or after the same.

The driver control portion 204 requests the status confirmation control portion 202 to inquire of the OS as to whether or not the driver 7D selected by the user in the printer object generation dialogue box WN2 is already installed. In response, the status confirmation control portion 202 makes the inquiry to the OS, and then makes a reply to the driver control portion 204.

In the case where the driver control portion 204 receives a reply to the effect that such a driver is not installed, it performs processing of requesting the driver 7D from the image processing apparatus 1 to download the same. The connection port generating portion 206 generates a port to which an IP address of the image processing apparatus 1 indicated in the setting data 7S that is sent from the image processing apparatus 1 this time is applied.

Figure 12B:
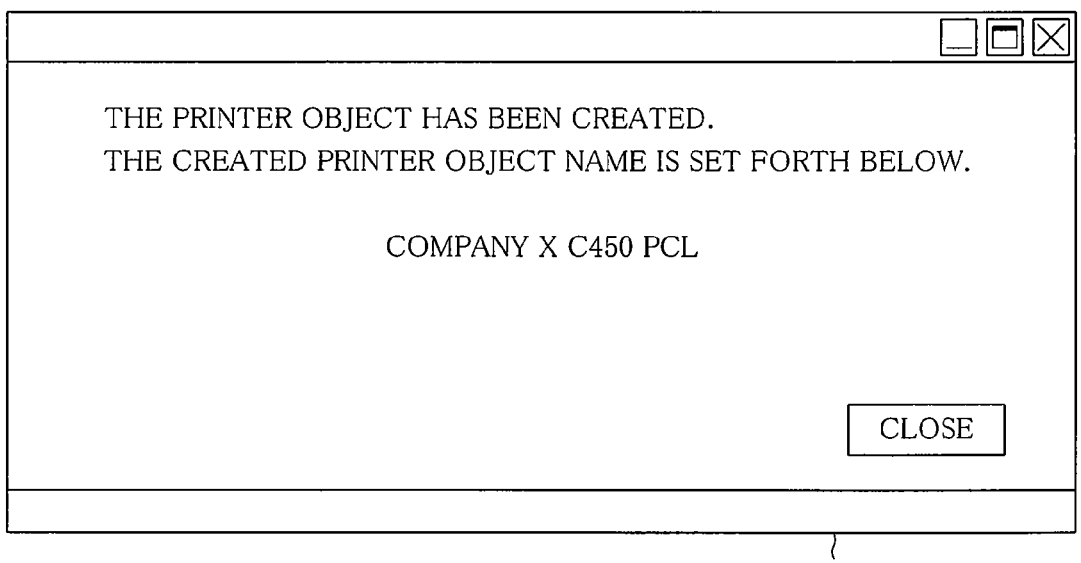

The printer object control portion 208 applies the port generated by the connection port generating portion 206 and a structure of an option for the image processing apparatus 1 indicated in the setting data 7S to the printer object generated by the printer object generating portion 207. This enables control of the image processing apparatus 1. After that, the printer object control portion 208 instructs the user notification portion 201 to display a result dialogue box WN4 as shown in FIG. 12B on the display 20e.

The following is a description of the entire processing flow in an image processing apparatus 1 and a terminal 2 with reference to flowcharts.

A user who intends to cause the terminal 2 to cooperate with the image processing apparatus 1 operates the image processing apparatus 1. Thereby, the user designates an address (an IP address, a host name or the like) of the terminal 2, and his/her user ID and password in the designation screen HG2 (see FIG. 9).

Responding to this, the image processing apparatus 1 performs processing as shown in FIG. 13. Specifically, the image processing apparatus 1 accepts the address, the user ID and the password that are designated (#11), sends the user ID and the password to the terminal 2, and requests the terminal 2 to perform user authentication (login authentication) (#12).

If a reply indicating that the user is an authentic user is not received from the terminal 2 (No in #13), then the image processing apparatus 1 displays an error message to prompt the user to perform designation again (#14).

If a reply indicating that the user is an authentic user is received from the terminal 2 (Yes in #13), then the image processing apparatus 1 generates setting data 7S (see FIG. 5) for the image processing apparatus 1 itself (#15). In the case where the image processing apparatus 1 already has setting data 7S with the latest contents, such setting data 7S may be called out. Then, the image processing apparatus 1 uses a protocol such as SMB or FTP to send the setting data 7S to an MFP setting folder for the terminal 2 (#16).

After that, a case may arise where a driver 7D is requested by the terminal 2. If this is the case (Yes in #17), then the image processing apparatus 1 sends the driver 7D to the terminal 2 (#18).

Figure 14:
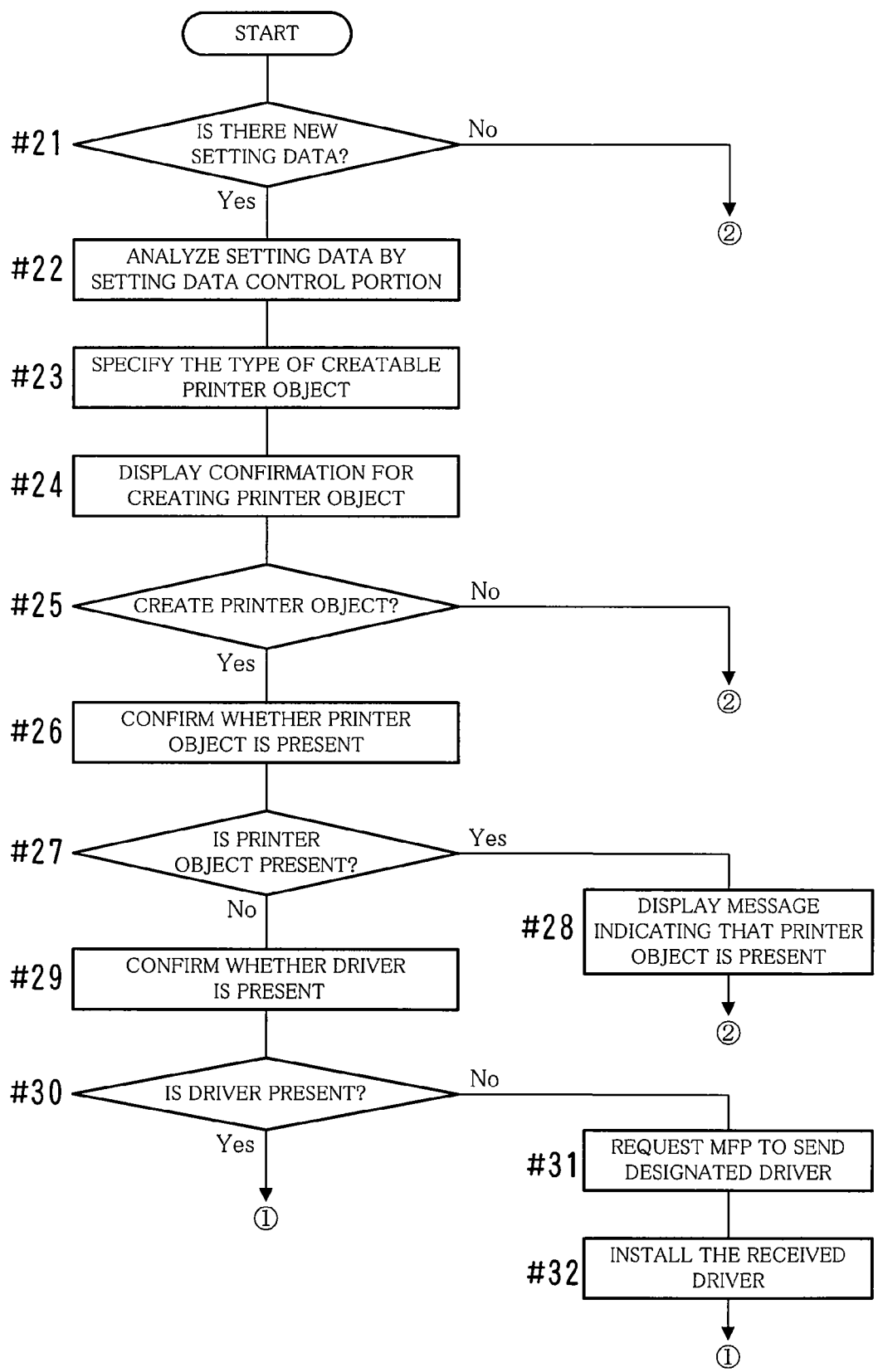
FIG. 14 is a flowchart showing an example of the entire processing flow in a terminal.
Figure 15:
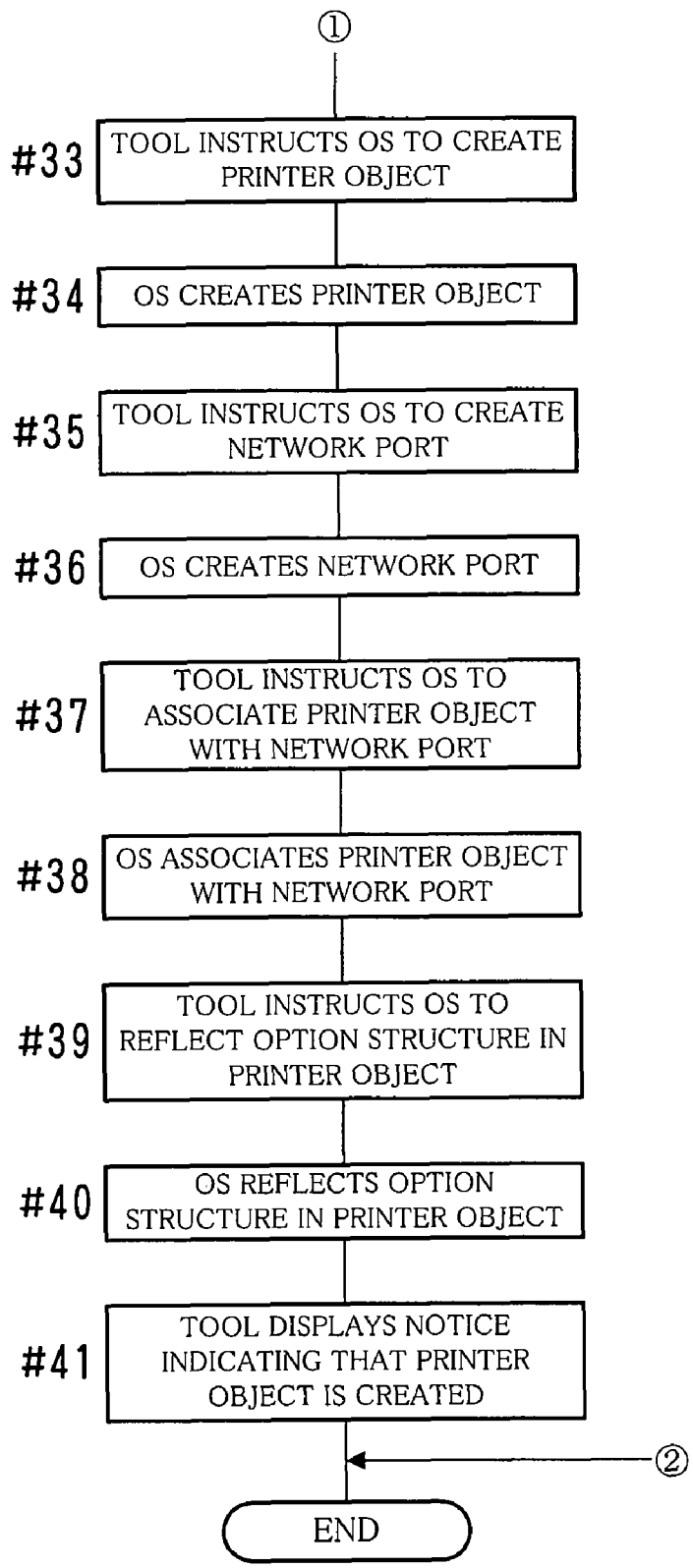
FIG. 15 is a flowchart showing an example of the entire processing flow in a terminal.

Meanwhile, the APM tool 2T in the terminal 2 performs processing according to the procedure shown in FIGS. 14 and 15. Specifically, when confirming that setting data 7S for the image processing apparatus 1 is newly saved in the MFP setting folder (Yes in #21 in FIG. 14), the terminal 2 analyzes the setting data 7S (#22). Based on the result, the terminal 2 specifies the contents of printer objects that can be generated (#23) and displays the printer object generation dialogue box WN2 (see FIG. 11) for presenting the printer objects to the user (#24).

If the user selects (designates) any one of the printer objects (Yes in #25), then the APM tool 2T in the terminal 2 uses the OS to confirm whether or not a printer object having the same contents as those of the selected printer object is already present (#26).

If such a printer object is already present (Yes in #27), then the terminal 2 displays the result dialogue box WN3 (see FIG. 12A) indicating the result and stops the processing of generating a printer object.

If such a printer object is not present (No in #27), then the terminal 2 generates the printer object selected by the user in the following manner.

The terminal 2 confirms whether or not the terminal 2 itself has a driver 7D used for the printer object (#29). If the terminal 2 does not have the driver 7D (No in #30), then the terminal 2 requests the driver D7 from the image processing apparatus 1, downloads and installs the same thereon (#31 and #32).

Referring to FIG. 15, the terminal 2 uses the OS to generate a printer object to which the driver 7D is applied (#33 and #34). Then, the terminal 2 uses the OS to generate a port (a network port) for connection to the image processing apparatus 1 (#35 and #36). The IP address for the image processing apparatus 1 is set for the port based on the setting data 7S obtained from the image processing apparatus 1.

The terminal 2 uses the OS to perform processing of associating the generated port with the generated printer object (#37 and #38). Further, the terminal 2 uses the OS to perform processing of reflecting, in the printer object, an option structure of the image processing apparatus 1 indicated in the setting data 7S (#39 and #40).

Then, the terminal 2 displays the result dialogue box WN4 (see FIG. 12B) indicating that processing regarding the printer object is completed (#41).

The following is a description of the processing flow in an image processing apparatus 1P and a terminal 2A, for example when the image processing system IMS is introduced in the company X having a plurality of branches and a user A who is an employee of the company X intends to cause the terminal 2A that is user's laptop personal computer to cooperate with the image processing apparatus 1P installed in the P-branch as the business trip destination.

The user A connects the terminal 2A to a router in the P-branch and thereby causes the terminal 2A to join the image processing system IMS. Then, the user A moves to a location where the image processing apparatus 1P is installed, operates the image processing apparatus 1P and designates an IP address of the terminal 2A and his/her user ID and password in the designation screen HG2 (see FIG. 9).

Figure 16:
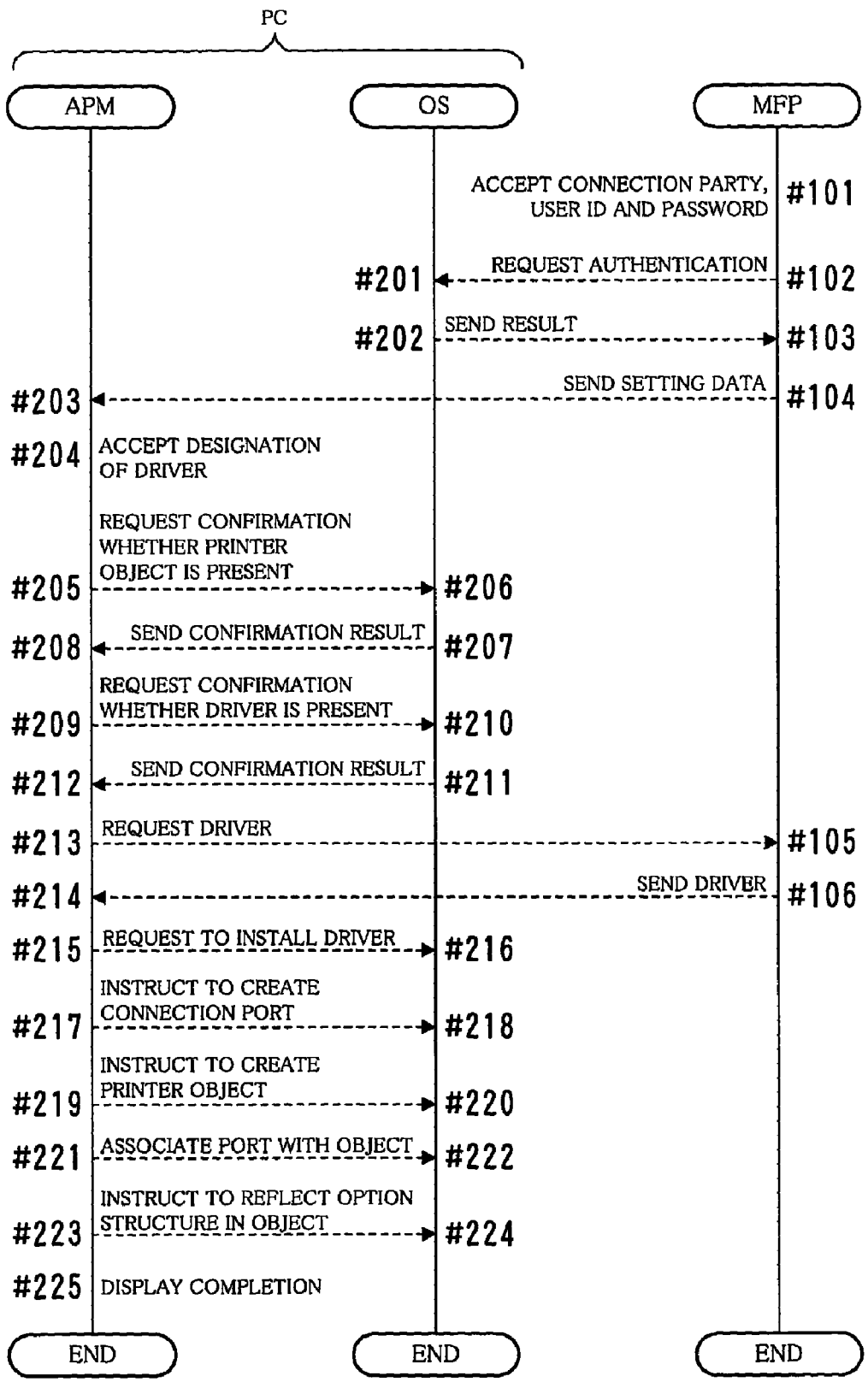
FIG. 16 is a flowchart showing an example of processing flow when a particular image processing apparatus is caused to cooperate with a terminal for the first time.

Referring to FIG. 16, when receiving the designation made by the user A (#101), the image processing apparatus 1P requests the terminal 2A to perform user authentication for the user A (#102).

In response, an OS of the terminal 2A performs user authentication for the user A (#201) and makes a reply indicating the result to the image processing apparatus 1P (#202).

If the image processing apparatus 1P receives a reply indicating that the user A is an authentic user (#103), then the image processing apparatus 1P sends setting data 7S therefor to an MFP setting folder in the terminal 2A (#104).

When detecting that the setting data 7S is saved in the MFP setting folder (#203), the APM tool 2T in the terminal 2A displays the printer object generation dialogue box WN2 (see FIG. 11). The user A who returned to the place where the terminal 2A is placed selects his/her desired printer object.

When receiving the selection of the printer object made by the user A (#204), the APM tool 2T inquires of the OS as to whether or not the same printer object as the printer object selected by the user A is already present (#205). The OS confirms that (#206) to send a reply indicating the result to the APM tool 2T (#207).

If the APM tool 2T receives a reply indicating that the same printer object is not present (#208), then it inquires of the OS as to whether or not a driver 7D in which the printer object designated by the user A is applied is present (#209). In response, the OS confirms that (#210) to send a reply indicating the result to the APM tool 2T (#211).

If the APM tool 2T receives a reply indicating that the driver 7D is not installed (#212), then it requests the driver 7D from the image processing apparatus 1p (#213).

The image processing apparatus 1p sends the driver 7D to the terminal 2A in accordance with the request made by the terminal 2A (#105 and #106).

When the driver 7D is downloaded (#214), the APM tool 2T requests the OS to install the driver 7D (#215). In accordance with the request, the OS installs the driver 7D on a predetermined folder (#216).

The APM tool 2T instructs the OS to generate a connection port and a printer object (#217 and #219). As instructed, the OS generates a port and a printer object based on the setting data 7S received in Step #203 (#218 and #220).

The APM tool 2T instructs the OS to associate the generated port with the generated printer object (#221). Following the instructions, the OS performs processing of associating the port with the printer object generated in Steps #218 and #220, respectively.

The APM tool 2T instructs the printer object to reflect therein (apply thereto) an option structure of the image processing apparatus 1P (#223). As instructed, the OS reflects the option structure indicated in the setting data 7S in the printer object (#224).

After completing the processing described above, the APM tool 2T displays the result dialogue box WN4 (see FIG. 12B) indicating that generation of the printer object is completed (#225).

With the processing discussed above, the user A can use the terminal 2A and the image processing apparatus 1P in cooperation with each other.

This embodiment makes it possible to cause a terminal 2 to cooperate with an image processing apparatus 1 without disclosing an IP address of the image processing apparatus 1. In addition, a user can cause the terminal 2 to cooperate with the image processing apparatus 1 merely by designating an IP address of the terminal 2 in the printer object generation dialogue box WN2. Thus, this embodiment enables the provision of a more user-friendly operation environment compared to conventional systems with the security of the image processing apparatus 1 protected.

Further, a user can automatically generate a printer object where configuration information and an IP address of an image processing apparatus 1 are reflected in a connection port, merely by designating an IP address of a terminal 2 of the user from the image processing apparatus 1. Stated differently, even if the user does not grasp information such as the configuration information and IP address of the image processing apparatus 1 that are generally known only to an administrator, the user can establish an environment where his/her terminal 2 is caused to cooperate with the image processing apparatus 1 to perform, for example, a printing process with a simple operation.

In this embodiment, a user is required to designate identification information of a terminal 2 that is a target for cooperation, a user ID and a password in the designation screen HG2 (see FIG. 9); however the following configuration may be adopted.

A database or table where identification information of a terminal 2 that is normally used is associated with a user ID of a user who uses the terminal 2 is prepared on user basis. A user is required to designate (enter) a user ID and a password in the designation screen HG2 as with a conventional login screen. However, the user is not required to designate identification information of the terminal 2. Then, an image processing apparatus 1 specifies identification information of a terminal 2 corresponding to the designated user ID based on the database or table described above.

In the embodiment described above, identification information, e.g., an IP address or a host name, for identifying an image processing apparatus 1 on a network is presented in the printer object generation dialogue box WN2 (see FIG. 11). Such identification information is presented only when it could be confirmed that a user is an authentic user, leading to the improvement of security protection for an image processing apparatus 1. However, unless a user logs in for managing an image processing apparatus 1, it is unnecessary to inform the user of identification information. Accordingly, identification information may be kept confidential in order to enhance the security.

In the embodiment described above, the overall configuration of the image processing system IMS, the image processing apparatus 1 and the terminal 2, the configurations of various portions thereof, the contents of the setting data 7S, the details of processing, the processing order, the operating system, and the like may be changed as needed, in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus comprising:
a designation portion that accepts a designation by a user at the image processing apparatus to designate target identification information for identifying a connection target apparatus to which the user intends to connect the image processing apparatus over a network; and
an identification information notification portion that accesses the connection target apparatus over the network by using the designated target identification information and informs the connection target apparatus of the image processing apparatus' own identification information for identifying the image processing apparatus on the network,
wherein the image processing apparatus is an image forming apparatus and the target apparatus is a computer.

2. The image processing apparatus according to claim 1, wherein the identification information notification portion informs the connection target apparatus of structure information on a structure of the image processing apparatus together with the image processing apparatus' own identification information for identifying the image processing apparatus.

3. The image processing apparatus according to claim 2, further comprising a printer that performs a printing process based on data sent from the connection target apparatus,
wherein the structure information indicates a structure relating to an optional extra for the printing process, the optional extra being added to the image processing apparatus.

4. The image processing apparatus according to claim 1, further comprising a user authentication process portion that performs a user authentication process for a user who desires to cause the connection target apparatus to cooperate with the image processing apparatus,
wherein the identification information notification portion informs the connection target apparatus of the image processing apparatus' own identification information for identifying the image processing apparatus only when authenticity of the user is verified.

5. An image processing apparatus comprising:
a designation portion that accepts a designation by a user at the image processing apparatus to designate user identification information of the user who uses a connection target apparatus to which the user intends to connect the image processing apparatus;
a connection target specifying portion that specifies connection target apparatus identification information based on the user identification information, the connection target apparatus identification information being for identifying the connection target apparatus to which the user intends to connect the image processing apparatus; and
an identification information notification portion that accesses the connection target apparatus by using the specified connection target apparatus identification information and informs the connection target apparatus of the image processing apparatus' own identification information for identifying the image processing apparatus,
wherein the image processing apparatus is an image forming apparatus and the target apparatus is a computer.

6. An image processing system comprising:
an image processing apparatus; and
a plurality of terminal apparatuses that are connectable to the image processing apparatus over a network,
the image processing apparatus including
a designation portion that accepts a designation by a user at the image processing apparatus to designate target identification information for identifying a connection target apparatus, to which the user intends to connect the image processing apparatus over a network, from among the plurality of terminal apparatuses, and
an identification information notification portion that accesses the connection target apparatus over the network by using the designated target identification information and informs the connection target apparatus of the image processing apparatus' own identification information for identifying the image processing apparatus on the network, and
each of the plurality of terminal apparatuses including
a setting process portion that performs a setting process for cooperating with the image processing apparatus based on the image processing apparatus' own identification information notified by the image processing apparatus,
wherein the image processing apparatus is an image forming apparatus and each of the plurality of terminal apparatuses is a computer.

7. A method executed by an image processing apparatus for communicating with a connection target apparatus to which a user intends to connect the image processing apparatus over a network, the method comprising:
accepting a designation by a user at the image processing apparatus to designate target identification information for identifying a connection target apparatus to which the user intends to connect the image processing apparatus over a network; and
informing the connection target apparatus of the image processing apparatus' own identification information for identifying the image processing apparatus on the network by using the designated target identification information,
wherein the image processing apparatus is an image forming apparatus and the connection target apparatus is a computer.

8. A method executed by a terminal for communicating with an image processing apparatus over a network, the method comprising:
receiving identification information sent by the image processing apparatus for identifying the image processing apparatus on the network, wherein the identification information is sent to the terminal based on an action by a user at the image processing apparatus; and
performing a process for communicating with the image processing apparatus over the network based on the identification information thus received,
wherein the image processing apparatus is an image forming apparatus and the terminal is a computer.

9. The method according to claim 8, further comprising receiving structure information on a structure of the image processing apparatus.

10. A method executed by a terminal for communicating with an image processing apparatus over a network, the method comprising:
receiving identification information sent by the image processing apparatus for identifying the image processing apparatus on the network;
performing a process for communicating with the image processing apparatus over the network based on the identification information thus received,
wherein the image processing apparatus is an image forming apparatus and the terminal is a computer; and
performing a process for associating a printer driver for the image processing apparatus with the identification information.

11. A method executed by a terminal for communicating with an image processing apparatus over a network, the method comprising:
receiving identification information sent by the image processing apparatus for identifying the image processing apparatus on the network;
performing a process for communicating with the image processing apparatus over the network based on the identification information thus received, wherein the image processing apparatus is an image forming apparatus and the terminal is a computer;
performing a process for associating a printer driver for the image processing apparatus with the identification information; and confirming whether or not the printer driver for the image processing apparatus is installed on the terminal itself, and downloading and installing the printer driver for the image processing apparatus when it is confirmed that the printer driver is not installed on the terminal itself.

12. A method executed by a terminal for communicating with an image processing apparatus over a network, the method comprising:

receiving identification information sent by the image processing apparatus for identifying the image processing apparatus on the network;

performing a process for communicating with the image processing apparatus over the network based on the identification information thus received, wherein the image processing apparatus is an image forming apparatus and the terminal is a computer; and performing a process for associating a printer driver for the image processing apparatus with the identification information, wherein a port for connecting the terminal to the image processing apparatus and the printer driver for the image processing apparatus are associated with the terminal.

13. A method executed by a terminal for communicating with an image processing apparatus over a network, the method comprising:

receiving identification information sent by the image processing apparatus for identifying the image processing apparatus on the network;

performing a process for communicating with the image processing apparatus over the network based on the identification information thus received, wherein the image processing apparatus is an image forming apparatus and the terminal is a computer;

receiving structure information on a structure of the image processing apparatus; and generating a printer object in which the identification information of the image processing apparatus that is received, the structure information that is received and a printer driver are associated with one another.

14. A non-transitory computer-readable medium storing a program for an image processing apparatus, the program causing the image processing apparatus to perform:

accepting a designation by a user at the image processing apparatus to designate target identification information for identifying a connection target apparatus to which the user intends to connect the image processing apparatus over a network; and accessing the connection target apparatus over the network by using the designated target identification information and informing the connection target apparatus of the image processing apparatus' own identification information for identifying the image processing apparatus on the network, wherein the image processing apparatus is an image forming apparatus and the connection target apparatus is a computer.

15. A non-transitory computer-readable medium storing a program for a computer, the program causing the computer to perform:

receiving identification information sent by an image processing apparatus for identifying the image processing apparatus on a network, wherein the identification information is sent to the terminal based on an action by a user at the image processing apparatus; and performing a process for communicating with the image processing apparatus over the network based on the identification information thus received, wherein the image processing apparatus is an image forming apparatus.

16. The non-transitory computer-readable medium according to claim 15, the program causing the computer to further perform a process for receiving structure information on a structure of the image processing apparatus.

17. A non-transitory computer-readable medium storing a program for a computer, the program causing the computer to perform:

receiving identification information sent by an image processing apparatus for identifying the image processing apparatus on a network;

performing a process for communicating with the image processing apparatus over the network based on the identification information thus received, wherein the image processing apparatus is an image forming apparatus; and associating a printer driver for the image processing apparatus with the identification information.

18. A non-transitory computer-readable medium storing a program for a computer, the program causing the computer to perform:

receiving identification information sent by an image processing apparatus for identifying the image processing apparatus on a network;

performing a process for communicating with the image processing apparatus over the network based on the identification information thus received, wherein the image processing apparatus is an image forming apparatus;

a process for associating a printer driver for the image processing apparatus with the identification information; and confirming whether or not the printer driver for the image processing apparatus is installed on the computer itself, and a process for downloading and installing the printer driver for the image processing apparatus when it is confirmed that the printer driver is not installed on the computer itself.

19. A non-transitory computer-readable medium storing a program for a computer, the program causing the computer to perform:

receiving identification information sent by an image processing apparatus for identifying the image processing apparatus on a network;

performing a process for communicating with the image processing apparatus over the network based on the identification information thus received, wherein the image processing apparatus is an image forming apparatus; and a process for associating a printer driver for the image processing apparatus with the identification information, wherein a port for connecting the computer to the image processing apparatus and the printer driver for the image processing apparatus are associated with the computer.

20. A non-transitory computer-readable medium storing a program for a computer, the program causing the computer to perform:

receiving identification information sent by an image processing apparatus for identifying the image processing apparatus on a network;

performing a process for communicating with the image processing apparatus over the network based on the identification information thus received, wherein the image processing apparatus is an image forming apparatus;

receiving structure information on a structure of the image processing apparatus; and generating a printer object in which the identification information of the image processing apparatus that is received, the structure information that is received and a printer driver are associated with one another.

\* \* \* \* \*